Figure 1:
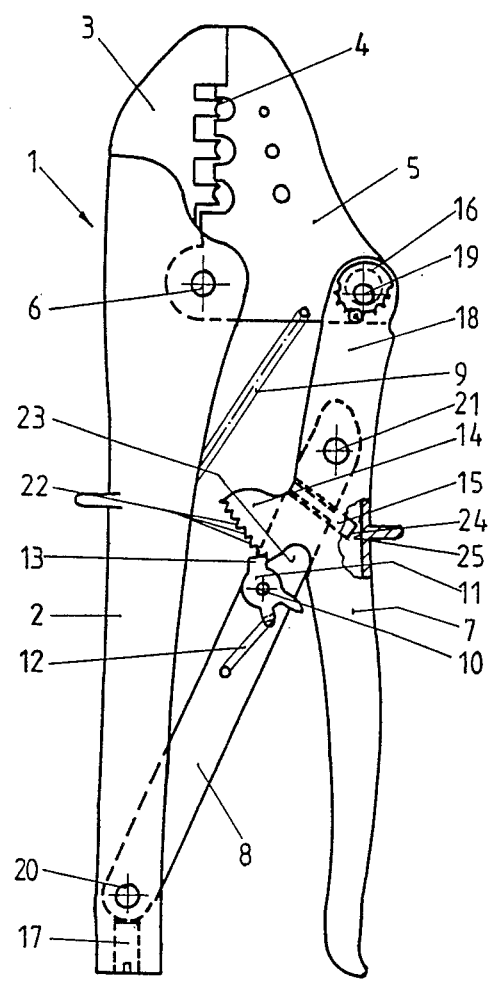

United States Patent [19]

Battenfeld

[11] Patent Number: 4,794,780

[45] Date of Patent: Jan. 3, 1989

[54] CRIMPER FOR CRIMPING CABLE TERMINALS, CABLE CONNECTORS, AND SIMILAR MATERIALS TO ELECTRIC CONDUCTORS, OPTICAL CONDUCTORS, ETC.

[75] Inventor: Kurt Battenfeld, Ebsdorfergrund, Fed. Rep. of Germany

[73] Assignee: WEZAG GmbH Werkzeugfabrik, Stadtallendorf, Fed. Rep. of Germany

[21] Appl. No.: 33,509

[22] Filed: Apr. 1, 1987

[30] Foreign Application Priority Data

Apr. 9, 1986 [DE] Fed. Rep. of Germany ....... 3611861
Mar. 18, 1987 [DE] Fed. Rep. of Germany ....: 3708727

[51] Int. Cl.$^4$ .............................................. B21D 7/06
[52] U.S. Cl. ........................................ 72/410; 81/313; 81/383; 29/751
[58] Field of Search ............... 72/410, 409; 81/313, 81/383, 395, 406; 29/751

[56] References Cited

U.S. PATENT DOCUMENTS

| | | | |
|---|---|---|---|
| 2,618,993 | 11/1952 | Carlson | 72/409 |
| 2,800,042 | 7/1957 | Demler | 72/410 |
| 3,157,075 | 11/1964 | Filia | 81/313 |
| 3,611,782 | 10/1971 | Eppler | 72/410 |
| 4,080,820 | 3/1978 | Allen | 72/410 |
| 4,126,936 | 11/1978 | Koller | 72/410 |
| 4,144,737 | 3/1979 | Izraeli | 72/409 |

FOREIGN PATENT DOCUMENTS

| | | | |
|---|---|---|---|
| 2555071 | 6/1977 | Fed. Rep. of Germany | 72/410 |
| 2521378 | 7/1977 | Fed. Rep. of Germany | 72/410 |
| 1522144 | 8/1978 | United Kingdom | 72/410 |

Primary Examiner—Daniel C. Crane
Attorney, Agent, or Firm—Max Fogiel

[57] ABSTRACT

A crimper for crimping cable terminals, cable connectors, and similar materials to electric conductors, optical conductors, etc. has two handles (2 & 7) that can be displaced toward each other and two crimping jaws (3 & 5), whereby one crimping jaw (5) is mounted so that it can move on the other (3). The moving handle (7) is mounted on an articulated support (19) on the moving crimping jaw (5). A toggle-lever drive mechanism consists of a pressure-application arm (8) and of a toggle-lever section (18) on the moving handle, whereby the ratio between lengths is at least approximately 2:1. The closing motion of the toggle-lever drive mechanism is terminated just before the extended state is attained by stops (24 & 25). At least one articulated support (19 or 20) can be displaced to vary the pressure. There is an automatic locking mechanism with a resiliently movable but stationary latch (11) that prevents the crimper from opening before crimping jaws have closed. The latch is mounted on the pressure-application arm and the automatic locking mechanism has a toothed section (14) with a number of teeth (22) rigidly fastened to the moving handle.

7 Claims, 3 Drawing Sheets

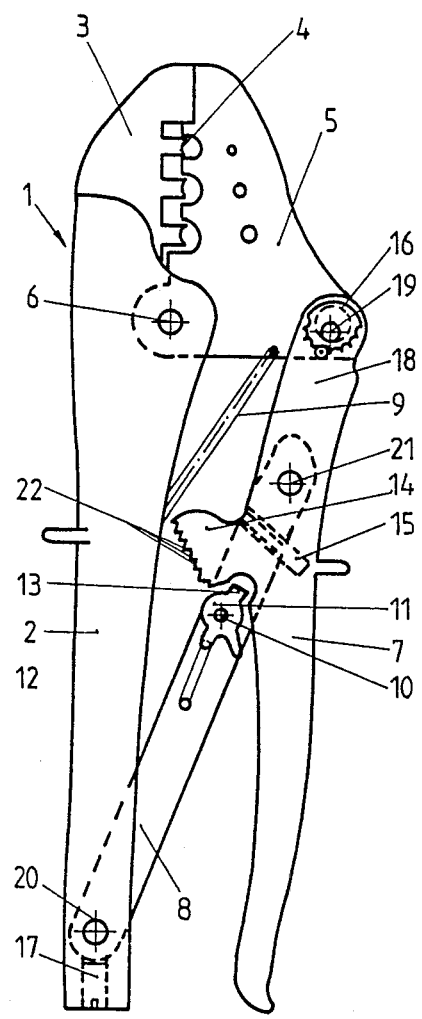
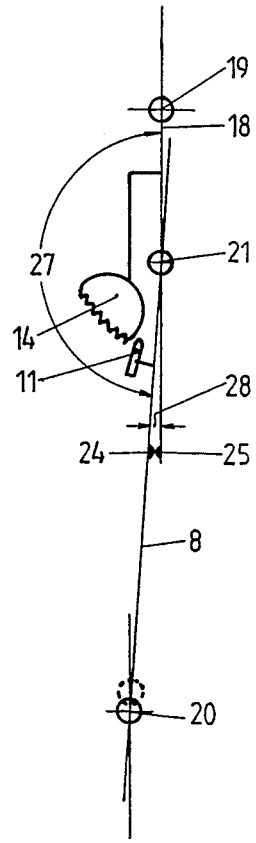
Fig. 3
Fig. 4

CRIMPER FOR CRIMPING CABLE TERMINALS, CABLE CONNECTORS, AND SIMILAR MATERIALS TO ELECTRIC CONDUCTORS, OPTICAL CONDUCTORS, ETC.

A crimper of this type is known from German AS No. 2 521 378. It is important to note that the crimper has a high transmission ratio. A toggle-lever drive mechanism consisting of a pressure-application arm and of one component of a moving handle that constitutes a toggle-lever section is employed. The toggle-lever section and the pressure-application arm are connected by means of a toggle. The moving handle engages a moving crimping jaw through an articulated support. The articulated support and the toggle more or less merge into the design of the moving handle. The pressure-application arm is at least twice as long as the toggle-lever section of the moving handle. The second transmission is dictated by how far the articulated support on the moving crimping jaw is from its pivot in relation to how far a crimping contour is from that pivot. The second transmission is approximately 1:1. The pressure-application arm of the toggle-lever drive mechanism is mounted on an articulated support on a stationary handle, a support that can be displaced to vary the pressure when the crimping jaws are closed. The toggle-lever drive mechanism is only exploited until just up to the extended state, meaning that the extended state is avoided by means of a stop, so that the crimper will open again only due to the force of a spring once a pressure-application procedure has been carried out. Pressure is easy to apply by hand due to the high transmission ratio. An automatic locking mechanism is provided to prevent the application of pressure from being prematurely discontinued. The locking mechanism has two teeth on the moving crimping jaw that operate in conjunction with a resiliently mounted latch on the stationary handle. Since the automatic locking mechanism is accordingly positioned in the vicinity of the articulation that the moving crimping jaw pivots around in relation to the stationary component of the crimper, the paths or angle that occur when the crimper closes are very small, so that not only the position of the two teeth but also the mounting and design of the latch must be established very precisely during manufacture if the automatic locking mechanism is to ensure a perfect closure that can be reproduced over a large number of crimpers. This, however, is in itself actually the purpose of such an automatic locking mechanism—to ensure that the pressure is completely applied and not discontinued prematurely, so that the crimping would not be carried out with the desired pressure and the desired level of pressure. The short strokes also make it possible to accommodate only two teeth on the moving crimping jaw. Since these two teeth only engage the resilient latch toward the end of the closing motion, it is still possible for the application of pressure to be discontinued very early and while still incomplete, before the automatic locking mechanism has engaged. Still, there is an advantage to the known automatic locking mechanism in that the articulated support for the pressure-application arm on the stationary handle can be displaced to vary the pressure in the closed state without simultaneously adjusting the angle at which the locking mechanism is engaged or disengaged.

German GM No. 7 205 611 discloses a crimper that features in addition to the stationary crimping jaw a crimping jaw that moves in a straight line. This crimper utilizes a toggle-lever drive mechanism consisting of a toggle-lever section on the moving handle and of a tie rod that leads to the crimping jaw. The ratio of the lengths of these components is approximately 1:1. There is a stop that prevents the toggle-lever drive mechanism from becoming fully extended. Thus, the crimper opens automatically subject to the force of a spring once the pressure has been applied. This design, although somewhat different, also involves an automatic locking mechanism that consists of three teeth mounted on the moving handle and of a resiliently mounted latch mounted on the stationary component of the crimper. The crimper also entails the drawback that, due to the short strokes that must be traveled along the automatic locking mechanism, the teeth and the latch must be positioned very precisely in order to establish the point or angle of opening at an operating point on the toggle lever in such a way that the identical operating point can be reproduced when the crimper is manufactured on an industrial scale.

A different type of crimper is known from German Patent No. 27 2 555 071. Although this crimper does have both a stationary and a pivoting crimping jaw as well as a stationary handle and a handle that is articulated to the moving crimping jaw and involves a toggle-lever section, the pressure-application arm, which is part of the toggle-lever drive mechanism, is approximately as long as the toggle-lever section, and the articulated support for the pressure-application arm is located approximately at the midpoint of the stationary handle. Since the moving handle travels very far when the crimper opens, the tool is very difficult to operate with one hand. The pressure that can be applied in this way is comparatively weak. An arm with a toothed section either extends parallel to the pressure-application arm or is integrated into it between the articulated support on the stationary handle and the toggle on the moving handle. There is a latch on the moving handle that constitutes in conjunction with the toothed section an automatic locking mechanism. The toothed section can in a practical way be long enough to engage over almost the total range of the closing motion. The articulated support for the pressure-application arm and the toothed arm can be displaced, specifically by means of an eccentric, to vary the pressure. When the eccentric acts only on the toothed arm and not on the pressure-application arm, it is only the effective angle of the toggle lever that is affected, and the pressure is not necessarily varied simultaneously. In the opposite situation, when the eccentric adjusts only the pressure-application arm and not the toothed arm, it is of course possible to adjust the pressure without necessarily adjusting the effective angle of the toggle lever as well. Still, a prerequisite is the separation of the two arms, of the pressure-application arm on the one hand and of the toothed arm on the other. When the two arms are integrated into one component and the adjustment is to occur in relation to the articulated support, with the effective length of the pressure-application arm being varied, German Patent No. 2 555 071 says that the adjustment of the pressure is necessarily relation to the adjustment of the effective angle of the toggle lever. Finally, the potential is also disclosed of employing a pressure-application arm with a separate moving toothed arm to adjust both the articulated support on the stationary component of the crimper and, in the opposite direction, the toggle-lever articulation in order to prevent, through the second means of adjustment, automatic de-adjustment of the effective toggle-lever angle. This is, however, very complicated and scarcely practical.

The object of the present invention is to improve a crimper of the aforesaid type to the extent that adjustments for varying the pressure will be simple without simultaneously adjusting the point or angle that the automatic locking mechanism opens at. The crimping jaws should also always close at the same effective toggle-lever angle even at various pressures. Furthermore, the automatic locking mechanism should operate over the longest possible closure stroke.

This object is attained in accordance with the invention in that the latch for the automatic locking mechanism is positioned on the pressure-application arm and in that the automatic locking mechanism has a toothed section with a number of teeth positioned stationary on the moving handle. The invention derives from the awareness that the point or angle that the automatic locking mechanism opens at will be constant when the toggle-lever drive mechanism consists only of the pressure-application arm and of the toggle-lever section on the moving handle and when the toothed section is rigidly connected to one of the two components and the resilient latch to the other. Varying the length of the pressure-application arm or of the toggle-lever section in order to adjust the pressure will accordingly not lead in this design to automatic adjustment of the effective toggle-lever angle, which remain constant. The toothed section is positioned on the moving handle for reasons of design and of manufacturing technology. Still, the opposite arrangement of the components of the automatic arm-locking mechanism would basically also be possible. The automatic locking mechanism is positioned at the aforesaid point at a location on the crimper where on the one hand it can easily be accommodated and on the other will travel greater strokes due to the transmission than would be possible in the vicinity of the crimping jaws. Thus, only normal manufacturing precision will be adequate to ensure reproducibility of the effective toggle-lever angle in industrial-scale manufacture. It is no longer necessary as at state of the art to provide a separate toothed arm in addition to the pressure-application arm or to undertake adjustment in two stages to prevent automatic de-adjustment in order to attain constancy of the effective toggle-lever angle. The pressure-application arm is also easy to manufacture and does not have to be angled as would be necessary to accommodate a toothed section. The components of the automatic locking mechanism must be rigidly connected to the pressure-application arm or to the moving handle, with of course the latch mounted in such a way that it can pivot. The parts must not however be capable of mutual axial displacement. Accommodating the toothed section on the moving component of the crimper also makes it possible to make the section large enough for almost the total closing process to be covered by the action of the automatic locking mechanism. Malfunctions of the type that occur when only one or two teeth are employed are accordingly prevented. The pressure can be reliably adjusted without having to vary anything at the effective toggle-lever angle. Wear on the teeth can also be adjusted for in this way. The design in accordance with the invention finally also makes it possible to accommodate the spring that opens the crimper at a more practical point because the automatic locking mechanism does not get in the way. Finally, the new crimper is easy and simple to handle when adjusting the pressure, which is a particular advantage for daily use.

When the toothed section is in one piece with the moving handle, the section will be especially simple to manufacture. It can be in the form more or less of an extension of one side of a handle with a U-shaped cross-section and will hence be located more or less necessarily in a plane paralleling the pressure-application arm, so that it can operate directly in conjunction with the latch, which is positioned on the pressure-application arm at that point, with no necessity for angling the toothed section in relation to the moving handle.

At least one articulated support can have either an adjustable eccentric or an adjustable screw to vary the pressure with. It is of course also possible to position the means of adjustment at both points of support. It is only essential that the toggle-lever articulation be kept free of means of adjustment because adjustment at that point would again lead to varying the effective toggle-lever angle.

The stops that limit the closing motion can in a practical way be adjustable to compensate for variations in manufacturing tolerance. Since the effective toggle-lever angle remains constant, it is also unnecessary to adjust the stops when the pressure is adjusted. The stops can have a setscrew that extends through the pressure-application arm with the free end of the setscrew operating in conjunction with the moving handle. This is also a skillful means of accommodation.

Figure 2:
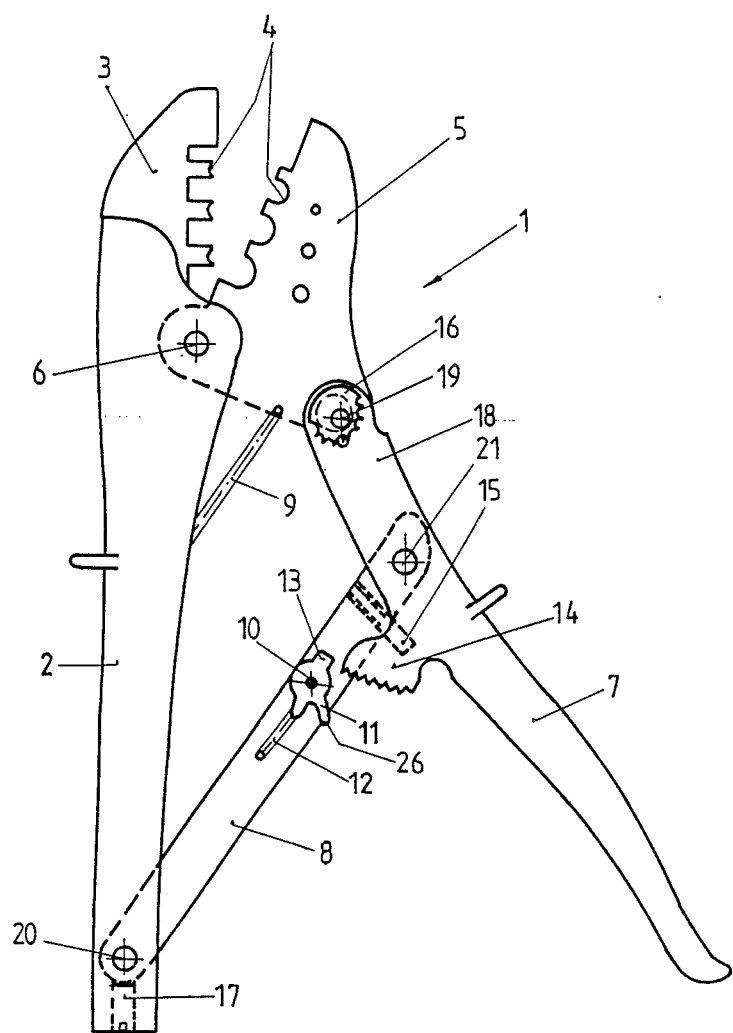

A preferred embodiment of the invention will now be specified with reference to the drawings, wherein FIG. 1 is a view of the crimper in the closed state just before arriving at its final position, FIG. 2 is a view of the crimper illustrated in FIG. 1 but in the open state, FIG. 3 is a view of the crimper at the end of a crimping procedure, and FIG. 4 is a diagram illustrating the effective toggle-lever angle.

The design of the crimper 1 illustrated in FIG. 1 is in itself known. Rigidly connected to the forward end of a stationary handle 2 is a crimping jaw 3 equipped with a crimping contour 4. Pivoting on the forward end of stationary handle 2 is a moving crimping jaw 5, which also has a crimping contour that complements crimping contour 4. It is secured with a pin 6.

Between stationary handle 2 and crimping jaw 5 is a toggle-lever drive mechanism that consists of part, specifically a toggle-lever section 18, of a moving handle 7 and of a pressure-application arm 8. Moving handle 7 is articulated to moving crimping jaw 5 at an articulated support 19, and pressure-application arm 8 to the rear end of stationary handle 2 at another articulated support 20. Also part of the toggle-lever drive mechanism, finally, is a toggle 21 that articulates toggle-lever section 18 to pressure-application arm 8. Pressure-application arm 8 is, as will be evident, much longer than toggle-lever section 18, which is represented by the interval between articulated support 19 and toggle 21. The ratio is at least approximately 2:1 and preferably even higher. The toggle-lever drive mechanism is exploited, however, only outside of its extended state, avoiding, that is, the position at which toggle 21 rests on the line connecting articulated supports 19 and 20. Exceeding the dead center is in particular to be avoided. The reason for exploiting the toggle-lever drive mechanism only up to just before its extended state is that a spring 9 is positioned between stationary handle 2 and moving crimping jaw 5. The spring is accordingly capable of opening the crimper again automatically once it has arrived at the end of its closing motion and hence at its effective toggle-lever angle.

The articulated support 19 for toggle-lever section 18 and simultaneously for the moving handle 7 of moving crimping jaw 5 can have an eccentric bolt 16, making it possible to vary the effective distance between articulated supports 19 and 20 and hence adjust the pressure between crimping jaws 3 and 5 in the closed position or compensate for any play resulting from wear. Articulated support 20 can also or solely be displaced in the same way, with an eccentric that is. It is, however, also possible to position a setscrew 17 in the vicinity of the articulated support 20 in stationary handle 2 to displace the support axially within the handle. Both adjustment potentials, which can be employed either individually or in combination, are intended strictly to adjust the pressure at the end of the closing motion.

The aforesaid transmission or length ratios between the different arms provides the crimper with a high transmission, so that a comparatively low manual force applied between stationary handle 2 and moving handle 7 will result in considerably higher pressure in the vicinity of crimping contour 4. To ensure that this desirable pressure, or that a pressure sufficient for crimping a cable terminal to an electric conductor, will be attained, an automatic locking mechanism is provided that consists of two mutually engaging components positioned in the vicinity of toggle 21 in association with pressure-application arm 8. The automatic locking mechanism accordingly has a latch 11 that pivots on a pin 10. A restoring spring 12 secures latch 11 at the midpoint of its pivot. Latch 11 has a projecting pawl 13 that operates in conjunction with a toothed section 14 positioned stationary on or in one piece with moving handle 7. Toothed section 14 has a number of teeth 22 distributed in the arc of a circle around toggle 21. The extent of the curve of toothed section 14 is dictated by the effective range of automatic locking mechanism. The extent is preferably long enough to engage the automatic locking mechanism over essentially the total stroke of the closing motion and to disengage it from teeth 22 only at the initial and final position of pawl 13. For this purpose there is in relation to the final position an empty space 23 adjacent to toothed section 14 on moving handle 7, whereas toothed section 14 terminates at the other end, associated with the initiation of a closing motion, also resulting in an empty space as will be evident in particular from FIG. 2.

In the vicinity of toggle 21 there is also a setscrew 15 that extends through pressure-application arm 8 and can be adjusted by means of an appropriate thread in relation to pressure-application arm 8 in such a way that the end of the screw that extends out of the arm projects more or less far out and hence operates in conjunction with the back of moving handle 7, which can have a U-shaped cross-section. Stops 24 and 25 are created at this point, as will be especially evident from FIG. 1. Stops 24 and 25 prevent the toggle-lever drive mechanism from overextending or entering dead center and accordingly limit its swing. An effective toggle-lever angle is accordingly established. This occurs in relation to the automatic locking mechanism, with stops 24 and 25 coming into contact when pawl 13 leaves the last tooth 22 during a closure motion and swings into space 23.

How crimper 1 operates in conjunction with the automatic locking mechanism will now be described.

Commencing with the open position illustrated in FIG. 2 and wherein the automatic locking mechanism is initially free, the parts to be crimped are positioned in crimping contour 4, and moving handle 7 is pivoted, approaching stationary handle 2, so that the toggle-lever drive mechanism begins to function and moving crimping jaw 5 is pivoted around pin 6 toward the closed position. This engages the projecting pawl 13 on latch 11 with the teeth 22 on toothed section 14. As soon as the first tooth is passed, the closing motion can no longer be left or released in that direction even if the parts to be crimped were obviously improperly inserted. It is accordingly advisable to manually and purposefully lift pawl 13 out of the gap between two teeth 22 by activating a trigger 26 on latch 11 in order to deactivate the automatic locking mechanism. Usually, however, when, that is, the parts have been correctly positioned, trigger 26 is of course not activated and the closing motion continues until the position illustrated in FIG. 1 has been attained, with the automatic locking mechanism still engaged although crimping jaws 3 and 4 are almost in contact. To attain the final state of a crimping procedure as illustrated in FIG. 3 it is now necessary to force moving handle 7 farther on into an even closer approximation to stationary handle 2. The requisite final pressure against crimping contour 4 is simultaneously attained and projecting pawl 13 is released from the teeth 22 in toothed section 14 and pivots into space 23. Stops 24 and 25 simultaneously come together and the accordingly reproduceably adjusted effective toggle-lever angle can no longer be increased. The parts are conventionally crimped and, by releasing or by yielding to moving handle 7, spring 9 will be capable of opening the crimper automatically because the dead center has been avoided.

The pressure prevailing at the terminal position can be adjusted by varying the interval between articulated supports 19 and 20 at either support without entailing the simultaneous adjustment of the automatic locking-mechanism angle at which it becomes active. Adjustment of the pressure is accordingly independent of the action of the automatic locking mechanism. The angle at which the locking mechanism opens again remains constant. This situation will now be explained with reference to FIG. 4, which is a schematic illustration of the relative positions of articulated support 19, articulated support 20, and toggle 21, showing that toggle 21 does not rest against the line between articulated supports 19 and 20 but to the right.

Pressure-application arm 8 and toggle-lever section 18 are represented by line segments at effective toggle-lever angle 27, which is as will be evident, somewhat less than 180°. Toothed section 14 and latch 11 are illustrated schematically. Toothed section 14 is rigidly fastened to toggle-lever section 18, whereas latch 11 is stationary but pivots on the pressure-application arm. The illustrated position is the position at which latch 11 has just left toothed section 14 during the course of a closing motion. An effective toggle-lever angle 27 is accordingly established and further ensured by stops 24 and 25, which establish a limiting angle 28. The sum of effective toggle-lever angle 27 and limiting angle 28 is 180°. It will be evident that the only essential for determining the relative positions of the components of the automatic locking mechanism, specifically toothed section 14 and latch 11, in relation to attaining release is effective toggle-lever angle 27 and not the length of either pressure-application arm 8 or toggle-lever section 18. Thus, displacing articulated support 20 as represented by the dotted line in FIG. 4 and hence adjustment of the effective length of pressure-application arm 8 does not lead to a difference in the engagement ratios between the components of the automatic locking mechanism, so that effective toggle-lever angle 27 will remain constant at the given pressure. The same is true for displacing articulated support 19 or articulated supports 19 and 20 simultaneously.

I claim:

1. A crimper for crimping cable terminals, cable connectors, and similar materials to electric conductors, optical conductors, comprising: two handles displaceable toward each other; two crimping jaws on said handles for providing a crimping contour; one of said handles being stationary, one stationary crimping jaw being rigidly fastened to said stationary handle; said stationary crimping jaw and said stationary handle comprising a stationary crimper component, the other crimping jaw pivoting on said stationary crimper component; a first articulated support securing the other handle to said other pivoting crimping jaw; a second articulated support on said stationary handle, a pressure-application arm that unites the two handles by being connected at the second articulated support and at a toggle within said other handle, said pressure-application arm having a predetermined length and being part of a moving crimper component; toggle-lever drive means comprising said pressure-application arm and a toggle-lever section on said other handle having a predetermined length extending between said toggle and first articulated support, said other handle being a movable handle, said toggle being part of said toggle-lever drive means, the length of the pressure-application arm to the length of the toggle-lever section comprising a transmission ratio of substantially 2:1, stops limiting closing motion between the moving and the stationary crimper components just before said toggle-lever drive means attains an extended state, said crimper opening out of the position in which the crimping jaws are closed subject to the force of a spring alone, a line between said first articulated support and the toggle on the moving handle coinciding substantially with the longitudinal axis of the moving handle, at least one of said articulated supports comprising pressure adjustment means by being displaceable to vary pressure; automatic locking means having a resiliently movable but stationary latch for preventing the crimper from opening before the crimping jaws have closed; said latch of said automatic locking means being positioned on said pressure-application arm; said automatic locking means having a toothed section with a plurality of teeth secured to said moving handle; said locking means being separate from said pressure adjustment means; said locking means opening always in an identical position of said movable handle and said pressure-application arm so that the transmission ratio remains unchanged independent of said pressure adjustment means.

2. A crimper as defined in claim 1, wherein said toothed section is integral as one piece with said moving handle.

3. A crimper as defined in claim 1, including adjustable eccentric means on at least one said articulated supports for varying applied pressure.

4. A crimper as defined in claim 1, including adjustable screw means on at least one of said articulated supports for varying applied pressure.

5. A crimper as defined in claim 1, wherein said stops are adjustable for compensating against variations in manufacturing tolerances.

6. A crimper as defined in claim 5, wherein said stops have a setscrew extending through said pressure-application arm, said setscrew having a free end operating in conjunction with said moving handle.

7. A crimper for crimping cable terminals, cable connectors, and similar materials to electric conductors, optical conductors, comprising: two handles displaceable toward each other; two crimping jaws on said handles for providing a crimping contour; one of said handles being stationary, one stationary crimping jaw being rigidly fastened to said stationary handle; said stationary crimping jaw and said stationary handle comprising a stationary crimper component, the other crimping jay pivoting on said stationary crimper component; a first articulated support securing the other handle to said other pivoting crimping jay; a second articulated support on said stationary handle, a pressure-application arm that unites the two handles by being connected at the second articulated support and at a toggle within said other handle, said pressure-application arm having a predetermined length and being part of a moving crimper component; toggle-lever drive means comprising said pressure-application arm and a toggle-lever section on said other handle having a predetermined length extending between said toggle and first articulated support, said other handle being a movable handle, said toggle being part of said toggle-lever drive means, the length of the pressure-application arm to the length of the toggle-lever section comprising a transmission ratio of substantially 2:1, stops limiting closing motion between the moving and the stationary crimper components just before said toggle-lever drive means attains an extended state, said crimper opening out of the position in which the crimping jaws are closed subject to the force of a spring alone, a line between said first articulated support and the toggle on the moving handle coinciding substantially with the longitudinal axis of the moving handle, at least one of said articulated supports comprising pressure adjustment means by being displaceable to vary pressure; automatic locking means having a resiliently movable but stationary latch for preventing the crimper from opening before the crimping jaws have closed; said latch of said automatic locking means being positioned on said pressure-application arm; said automatic locking means having a toothed section with a plurality of teeth secured to said moving handle; said locking means being separate from said pressure adjustment means; said locking means opening always in an identical position of said movable handle and said pressure-application arm so that the transmission ratio remains unchanged independent of said pressure adjustment means; said toothed section being integral as one piece with said moving handle; adjustable eccentric means on at least one said articulated supports for varying applied pressure; said stops being adjustable for compensating against variations in manufacturing tolerances and having a setscrew extending through said pressure-application arm, said setscrew having a free end operating in conjunction with said moving handle.

* * * * *